US012570026B2

(12) United States Patent
Kirzhner et al.

(10) Patent No.: US 12,570,026 B2
(45) Date of Patent: Mar. 10, 2026

(54) ANTI-MICROBIAL ADDITIVE AND PROPERTIES TO FOAM TO PREVENT MOLD

(71) Applicant: LEAR CORPORATION, Southfield, MI (US)

(72) Inventors: Rochelle Kirzhner, Royal Oak, MI (US); Reza Fard-Aghaie, Hamburg (DE); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 985 days.

(21) Appl. No.: 17/549,054

(22) Filed: Dec. 13, 2021

(65) Prior Publication Data

US 2023/0182351 A1 Jun. 15, 2023

(51) Int. Cl.
| | |
|---|---|
| *B29C 39/00* | (2006.01) |
| *A01N 55/00* | (2006.01) |
| *B29K 75/00* | (2006.01) |
| *B60N 2/00* | (2006.01) |
| *C08G 18/32* | (2006.01) |
| *C08G 18/72* | (2006.01) |
| *C08G 101/00* | (2006.01) |
| *C08K 3/015* | (2018.01) |

(52) U.S. Cl.
CPC ............ *B29C 39/003* (2013.01); *A01N 55/00* (2013.01); *B60N 2/00* (2013.01); *C08G 18/3203* (2013.01); *C08G 18/72* (2013.01); *C08K 3/015* (2018.01); *B29K 2075/00* (2013.01); *C08G 2101/00* (2013.01)

(58) Field of Classification Search
CPC ...... B29C 39/003; C08K 3/015; A01N 55/00; B60N 2/00; C08G 18/3203; C08G 18/72; C08G 2101/00; B29K 2075/00
See application file for complete search history.

(56) References Cited

U.S. PATENT DOCUMENTS

| | | | |
|---|---|---|---|
| 4,937,273 | A | 6/1990 | Okuyama et al. |
| 8,025,959 | B2 | 9/2011 | Hashiba et al. |
| 8,852,639 | B2 | 10/2014 | MacKay |
| 8,933,140 | B2 | 1/2015 | Peterson et al. |
| 10,034,478 | B2 | 7/2018 | Krasnow et al. |

(Continued)

FOREIGN PATENT DOCUMENTS

| | | |
|---|---|---|
| CN | 105693972 B | 6/2016 |
| WO | 2012/172496 A1 | 12/2012 |
| WO | WO 2014102228 * 7/2014 ............. A01N 25/10 |

*Primary Examiner* — Shane Fang
(74) *Attorney, Agent, or Firm* — Brooks Kushman P.C.

(57) ABSTRACT

A method for forming polyurethane foams for vehicle seat components in a molding apparatus is provided. The method includes a step of directing one or more polyol compositions into a mold. Each of the one or more polyol compositions includes a polyol, water, and a catalyst. The method also includes a step of directing an isocyanate composition into the mold, the isocyanate composition including one or more isocyanates. The one or more polyol compositions and the one or more isocyanates are combined into a reaction composition that forms a foamed vehicle seat component. Characteristically, the mold has a shape that defines a foamed vehicle seat component. Characteristically, either the one or more polyol compositions and/or the isocyanate composition includes a liquid antimicrobial agent that is a liquid at temperatures above 10° C.

5 Claims, 2 Drawing Sheets

(56)        References Cited

U.S. PATENT DOCUMENTS

| | | | |
|---|---|---|---|
| 2007/0125780 | A1 | 6/2007 | Shiina et al. |
| 2013/0295371 | A1* | 11/2013 | Peterson ................ C08J 9/0009 |
| | | | 428/305.5 |
| 2015/0373989 | A1* | 12/2015 | Krasnow ................. A61L 15/46 |
| | | | 424/405 |
| 2019/0084452 | A1 | 3/2019 | Hagedorn et al. |
| 2020/0102418 | A1* | 4/2020 | Ali ......................... C08G 18/14 |

* cited by examiner

ANTI-MICROBIAL ADDITIVE AND PROPERTIES TO FOAM TO PREVENT MOLD

TECHNICAL FIELD

In at least one aspect, vehicle seat components composed of polyurethane foam that is resistant to bacteria, fungi, mold and mildew.

BACKGROUND

Polyurethane foams are used in a number of automobile interior applications. Rigid, semi-rigid and flexible foams are manufactured through the reaction of poly-isocyanates with polyols in the presence of various additives. Since polyurethane components include natural renewable contents, it is well known that these foams can be a nutrition source for bacteria. Therefore, these components tend to spoil via mold and mildew formation. Moreover, the micro-organisms within the foam matrix can produce undesirable odor followed by migration of toxic byproducts to the surface, causing trim color discoloration (e.g., pink staining). Such undesirable odor or trim cover discoloration can also be enhanced not only by the effect of environmental conditions (e.g., humidity, temperature), but also additional nutrition sources like gradual penetration of passenger sweats or accidental spill of drinks by vehicle occupants into the foam matrix through the trim cover.

Most antibacterial agents used in the polyurethane industry are made of metal salts or organic compounds in powder form dispersed in a liquid media as a carrier. (see for example, Patents WO2012172496A1, U.S. Pat. Nos. 4,937, 273, 8,852,639). Typically, these powders includes fine solid particle (e.g., microsized or nanosized) to enable it to be mixed into a polyol blend. Foamed automotive seats are manufactured from blending stations. The polyol blends used in the blending stations are prepared from chemical components and then pumped into the polyurethane machine day tanks. The majority of foam machines making molded foams are high-pressure machines types that have multiple storage tanks (e.g., polyols and/or isocyanate day tanks). The polyols and isocyanates are injected at high pressure (e.g., 160 bar) by special injectors into the mixing chamber. After mixing, the resin is discharged into the molding apparatus.

There are numerous drawbacks to the use of the powder antibacterial dispersions for automotive seat foams. For example, depending on the solid content and dosing quantity of such dispersions into polyol especially by low water foam systems, the viscosity of pre-blended polyol will rise and the machine pumps may not be able to pump the right dose to mixing head and need to use more powerful pumps which has financial impact. (i.e., the blend becomes more viscous as more solids are added). Powdered particles also tend to settle in storage drums or IBC stations and separate from the liquid carrier. To homogenize the delivered product again, additional cost must be taken in account to mix the raw material prior to use. When the molding machine is not in operation (e.g weekends) the suspended particles in polyol tank will be settled down at bottom of the day tank and by the time production is restarted the sedimented material may not be mixed back properly into the polylol blend thereby causing uneven distribution of the antibacterial agent in the pre-blended polyol. Furthermore, the suspended material will also sediment on the surface of injection nozzles, causing the nozzles not to seal the mixing chamber correctly and letting polyol leak into the mixing chamber. This can cause a breakdown of the injection-nozzle package resulting in additional maintenance costs to change the nozzles frequently. It should be appreciated that there are potential negative effects on physical properties (e.g. elongation, tensile, tear, etc.) due to the presence of unreacted particles within the foam matrix. Finally, uneven distribution of particles in foam matrix can result in an insufficient antibacterial effect.

Accordingly, there is a need for improved processes for forming foamed polyurethane seat components.

SUMMARY

In at least one aspect, a method for forming polyurethane foams for vehicle seat components in a molding apparatus is provided. The method includes a step of directing one or more polyol compositions into a mold. Each of the one or more polyol compositions includes a polyol, water, and a catalyst. The method also includes a step of directing an isocyanate composition into the mold, the isocyanate composition including one or more isocyanates. The one or more polyol compositions and the one or more isocyanates are combined into a reaction composition that forms a foamed vehicle seat component. Characteristically, the mold has a shape that defines a foamed vehicle seat component. Characteristically, either the one or more polyol compositions and/or the isocyanate composition includes a liquid antimicrobial agent that is a liquid at temperatures above 10° C.

In at least one aspect, a molded polyurethane vehicle seat component is provided. The molded polyurethane vehicle seat component includes a reaction product of a reaction composition including one or more isocyanates, one or more polyols, water, a liquid antimicrobial agent that is a liquid at temperature above 10° C., and a catalyst. Characteristically, the reaction product being formed in a mold shape to form the molded polyurethane vehicle seat component.

In another aspect, the antimicrobial agent is mixed and distributed into foam matrix and has no additional cost as using dispersions as mentioned above.

In another aspect, the liquid antimicrobial agent has minimal impact on physical properties of the foamed polyurethane vehicle seat component with minimal impact on foam processing.

In another aspect, the liquid antimicrobial agent imparts high antibacterial efficiency to foamed vehicle seat component due to it efficient distribution into the polyurethane foam matrix.

In another aspect, the liquid antimicrobial agent does not migrate to the foam surface thereby avoiding any adverse effects a vehicle occupant's skin.

To minimize the above mentioned toxins which may a have adverse effect on passenger health, antimicrobial agents in liquid, form is added to foam seats without compromising any physical property or VOC of finished foam.

In another aspect, liquid antimicrobial agent imparts odor and stain protection to the foamed In another aspect, a method for Durable hygiene foam seat even at high humidity and temperature environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
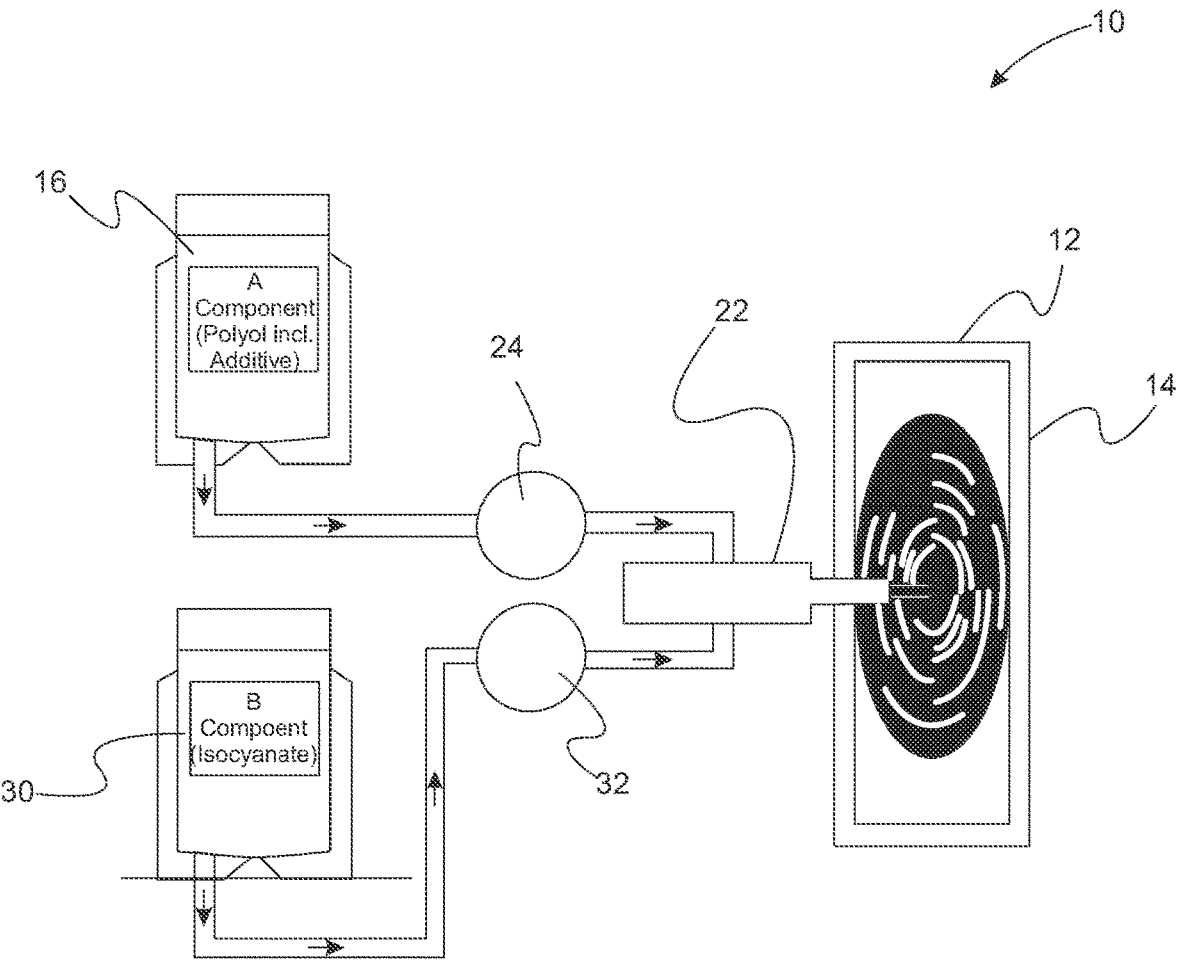
FIG. 1. Schematic of a molding apparatus for implementing a method for forming polyurethane foams.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

The term "residue", means a portion, and typically a major portion, of a molecular entity, such as molecule or a part of a molecule such as a group, which has underwent a chemical reaction and is now covalently linked to another molecular entity. In a refinement, the term "residue" means and organic structure that is incorporated into the polymer by a polycondensation or ring-opening polymerization reaction involving the corresponding monomer. In another refinement, the term "residue" when used in reference to a monomer or monomer unit means the remainder of the monomer unit after the monomer unit has been incorporated into the polymer chain. When a polymer component or a portion thereof does not react when included in a combination, the residue is the unreacted polymer component in reference to the combination.

Throughout this application, where publications are referenced, the disclosures of these publications in their entireties are hereby incorporated by reference into this application to more fully describe the state of the art to which this invention pertains.

Abbreviations:

"PU" means polyurethane.

Referring to FIG. 1, a schematic of a molding apparatus for implementing a method for forming polyurethane foams that is mold resistant is provided. Molding apparatus 10 includes a mold 12 having a mold cavity 14. The method includes a step of directing one or more polyol compositions (component A) from one or more polyol storage tanks 16 (e.g., component A day tank) into mixing chamber 22 to form a reaction composition, and then into mold cavity 14. Each one or more polyol compositions include a polyol, water, and a catalyst. Typically, the one or more polyol compositions 16 are directed into the mixing chamber 22 and then the mold cavity 14 via one or more injector pumps 24.

Still referring to FIG. 1, one or more isocyanate compositions (component B) from one or more isocyanate storage tanks 30 (component B day tanks) are directed into mixing chamber 22, and then into mold cavity 14. The isocyanate composition(s) and the polyol composition(s) react to form a foamed polyurethane vehicle seat component in the mold cavity 14. Typically, isocyanate compositions are directed into the mixing chamber 22 and then the mold cavity 14 via injector pumps 32. Typically, the isocyanate composition 30 includes one or more isocyanates. Therefore, the one or more polyol compositions and the isocyanate composition are combined into a reaction composition within mold cavity 14. Typically, the reaction composition reacts to form the polyurethane at temperatures with the mold at a temperature from about 45° C. to 65° C. and at pressures from about 100 to 200 bar. Advantageously, the vehicle seat components care resistant to bacteria, fungi, mold and mildew.

Component A is prepared in separate unit called blending station where all components (base polyols, Catalysts, cross-linkers Silicone surfactants pigments liquid anti-bacteria), are pumped into a Blender and after mixing all components and have a homogenous blend the blend is pumped in high pressure machine Component A day tank. Component B as separate stream also from storage tank is pumped to high pressure machine Day tank. The raw material temperature in Day tanks are normally kept at 23+/−2° C. and the machine mixing head temperature between 25-28° C.°. By mixing B component pressure ranges from 110-140 and component A 140-160 Bar.

Advantageously, at least one of the one or more polyol compositions 16 and/or the and the one or more isocyanate compositions 30 includes a liquid antimicrobial agent that is a liquid at temperatures relevant to the polyurethane molding process and the formed vehicle seat component (e.g. −30° C. to 150° C.). In a refinement, liquid antimicrobial agent that is a liquid at temperatures above 25° C., 20° C., 10° C., 10° C., 0° C., −10° C., −20° C., or −30° C. In a variation, the liquid antimicrobial agent is an isothiazolone. It should be appreciated these limitations on the liquid antimicrobial agent do not imply that the liquid antimicrobial agent is also a liquid at lower temperature. Examples of isothiazolones includes antimicrobial agent include, but are not limited to, 2-n-butyl-1,2-benzisothiazolin-3-one, 2-n-octylisothiazolin-3-one, methylisothiazolin-3-one, and combinations thereof. In this regard, 2-n-butyl-1,2-benzisothiazolin-3-one is found to be particularly useful. It should be appreciated that 2-n-butyl-1,2-benzisothiazolin-3-one is also referred to as 2-butyl-1,2-benzothiazol-3-one, N-butyl-1,2-benzisothiazolin-3-one, and 2-butyl-1,2-benzothiazol-3 (2H).

In a variation, the reaction composition includes the liquid antimicrobial agent in an amount of 0.1 to 2 weight percent of the total weight of the reaction composition. In a refinement, the reaction composition includes the liquid antimicrobial agent in an amount of 0.3 to 1.2 weight percent of the total weight of the reaction composition. Therefore, at least one polyol composition includes the liquid antimicrobial agent in an amount of 0.2 to 6 weight percent of the total weight the at least one polyol composition. In a refinement, at least one polyol composition includes the liquid antimicrobial agent in an amount of 0.4 to 2.5 weight percent of the total weight the at least one polyol composition. Similarly, the isocyanate composition can include the liquid antimicrobial agent in an amount of 0.2 to 6 weight percent of the total weight the at least one polyol composition. In a refinement, the isocyanate composition includes the liquid antimicrobial agent in an amount of 0.4 to 2.5 weight percent of the total weight the at least one polyol composition. It should be appreciated that typically, the liquid antimicrobial agent is included in one or more of the polyol compositions.

As set forth above, a plurality of polyol streams are directed into the mold to transport the one or more polyol compositions. Each polyol stream includes a base polyol, a polymer polyol, a catalyst, and water. In a refinement, the base polyol includes a component selected from the group consisting of polymers with terminal hydroxyl groups a polyether polyol, copolymers with terminal hydroxyl groups, and combinations thereof. In a refinement, the base polyol is a polyether polyol or a polyester polyol. In another refinement, the base polyol is a high molecular weight polyether polyol. In still another refinement, the base polyol is a mixture of high molecular weight polyether polyols. The mixtures of high molecular weight polyether polyols can be a mixture of di- and tri-functional compounds that may have different molecular weight. In a refinement, the polyether polyols alone or in the mixture can have a number average molecular weight of from about 500 Daltons to 8000 Daltons. In a further refinement, the polyether polyols alone or in the mixture can have a number average molecular weight of from about 1,000 Daltons to 6,000 Daltons. Examples of di- and tri-functional materials include, but are not limited to polyethylene glycol, polypropylene glycol, glycerol-based polyether triols, trimethylolpropane-based polyether triols, and the like, and mixtures thereof. In some refinements, the polyether polyols have a hydroxyl number ranging from 30.0 to 33.0 mg KOH/g, a specific gravity of 1.03, a flash point of 171° C., and density of 8.59 lb./gal. In a variation, the polyoxyalkylene polyol has a hydroxyl number ranging from 18.2 to 22.2 mg KOH/g, a specific gravity of 1.6, a flash point of 213° C., and a density of 8.80 lb./gal. Suitable examples of the polyoxyalkylene polyol are HYPERLITE® 1629, HYPERLITE® 1650, HYPERLITE® E-824, HYPERLITE® E-863, HYPERLITE® E-960 and HYPER-LITE® E-852 commercially available from Covestro located in Leverkusen, Germany.

The one or more isocyanates used in the methods set forth can include a component selected from the group consisting of diisocyanates, triisocyanates, and combination thereof. Examples of diisocyanates include, but are not limited to, trimethylene diisocyanate, tetramethylene diisocyanate, pentamethylene diisocyanate, hexamethylene diisocyanate, heptamethylene diisocyanate, octamethylene diisocyanate, 2-methylpentamethylene 1,5-diisocyanate, 2-ethylbutylene 1,4-diisocyanate, pentamethylene 1,5-diisocyanate, and butylene 1,4-diisocyanate. Examples of triisocyanates include 1,3,5-triisocyanate, toluene 2,4,6-triisocyanate, triphenylmethane 4,4',4" triisocyanate, and combinations thereof. Therefore, the one or more isocyanates can include a component selected from the group consisting of trimethylene diisocyanate, tetramethylene diisocyanate, pentamethylene diisocyanate, hexamethylene diisocyanate, heptamethylene diisocyanate, octamethylene diisocyanate, 2-methylpentamethylene 1,5-diisocyanate, 2-ethylbutylene 1,4-diisocyanate, pentamethylene 1,5-diisocyanate, and butylene 1,4-diisocyanate, 1,3,5-triisocyanate, toluene 2,4,6-triisocyanate, triphenylmethane 4,4',4" triisocyanate, and combinations thereof.

As set forth above, the methods also use a catalyst. In a refinement, the catalyst is a tertiary amine. Examples of such catalyst include, but are not limited to, 1,4-diazabicyclo(2,2,2)octane, bis(2,2-dimethylamino)ethyl ether, N-ethylmorpholine, diethylenetriamine, triethylenediamine/glycol solutions, N,N-bis-(3-dimethylaminopropyl)-N-isopropanolamine, N-(3-dimethylaminopropyl)-N,N-diisopropanolamine, N-(3-dimethylaminopropyl)urea, N,N'-bis(3-dimethylaminopropyl)urea, 2-(2-dimethylaminoethoxy)ethanol, and combinations thereof. Typically, when present, the catalyst is present in an amount from about 0.1 to 2% of the total weigh of the polyol composition.

In another refinement, the polyol composition includes additives such as water, physical blowing agents, crosslinkers, amine/metal based catalysts, silicone surfactants, cell openers, solid fillers, pigments, anti-uv, anti-oxidants, anti-static, flame retardants, and additional antimicrobial agents. Typically, the total amount of additives (i.e., sum of all additives) is present in an amount from about 0.1 to 15 weight percent of the total weigh of the polyol composition.

Therefore, a typical polyol composition includes from about 80 to 98 weight percent polyols as set forth above, from about 2 to 8 weight percent water, from about 0.1 to 1 weight percent catalysts, from about 0.1 to 2 weight present surfactant.

In a variation, the polyurethane reaction mixture for forming the foamed polyurethane seat component includes from about 25 to 50 weight percent of the isocyanate composition and about 75 to 50 weight percent of the polyol composition.

In another embodiment, a molded polyurethane vehicle seat component by the methods set forth herein is provided.

Figure 2:
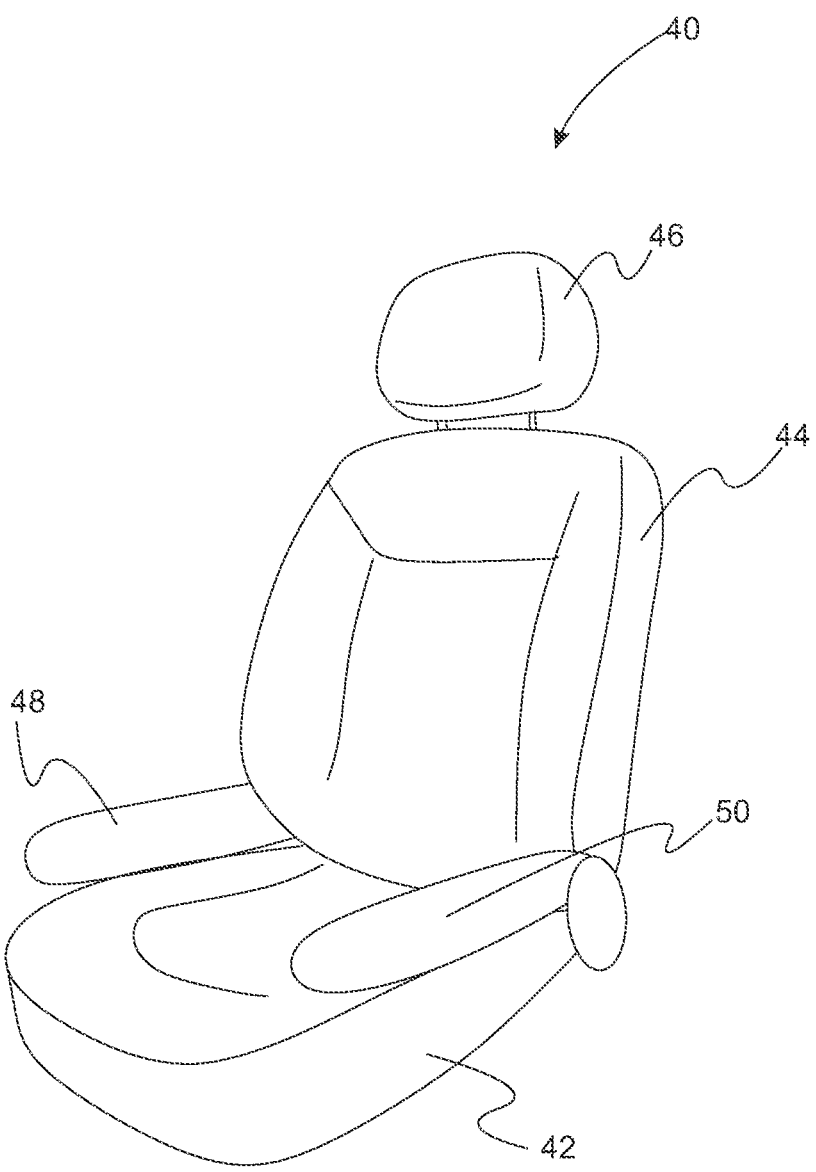
FIG. 2. Perspective view of foamed polyurethane seat components formed by the methods described herein.

Examples of vehicle seat components include vehicle seat bottom cushions, seatback cushions, head restraint cushions, and armrest cushions. FIG. 2 provides a perspective view of the foamed polyurethane components of a vehicle seat. Vehicle seat 40 includes seat bottom cushion 42, seat back cushion 44, heat restraint cushion 46, armrest cushion 48, and armrest cushion 50. The molded seat component is composed of the reaction product of polyurethane reaction composition that is formed by combining a polyol composition and an isocyanate composition as set forth above. In particular, the reaction composition includes one or more isocyanates, one or more polyols, water, a liquid antimicrobial agent that is a liquid at temperature above 10° C. The details of the reaction product are the same as set forth above for the method for forming polyurethane foams in a molding apparatus. Characteristically, the reaction product being formed in a mold shape to form the molded polyurethane vehicle seat component. In a refinement, the polyurethane foam has a density from about 35 kg/m$^3$ to 70 kg/m$^3$. Details of the polyol compositions, liquid antimicrobial agent including ranges are set forth above. In particular, the molded polyurethane vehicle seat component includes the liquid antimicrobial agent and/or residues thereof in an amount of 0.1 to 2 weight percent of the total weight of the molded polyurethane vehicle seat component. In a refinement, the molded polyurethane vehicle seat component includes the liquid antimicrobial agent and/or residues thereof includes the liquid antimicrobial agent in an amount of 0.3 to 1.2 weight percent of the total weight of the molded polyurethane vehicle seat component.

The following examples illustrate the various embodiments of the present invention. Those skilled in the art will recognize many variations that are within the spirit of the present invention and scope of the claims.

Two polyurethane sample families were prepared. The amount of the liquid antimicrobial agent N-butyl-1,2-benzisothiazolin-3-one was systematically varied. The results demonstrate significant inhibition of bacterial and fungal growth as summarized in Table 1. It is pointed out that he JIS Z 2801 method test is an industry standard for testing the ability of a surface to inhibit the growth of microorganisms. ASTM G-21 is a test for fungal resistance test

TABLE 1

| [] Antimicrobial Test Results. | | | | | |
|---|---|---|---|---|---|
| Sample family | Liquid anti- | Jiz z 2801 Antibacterial Surface Test | | ASTM G-21 Fungal resistance test | |
| | microbial (%) | *Escherichia coli* | *Staphylococcus aureus* | Nutrient salts agar | Malt agar |
| 1 | 0 | No reduction in bacterial count | No reduction in bacterial count | Fugal growth failed to establish | Fugal growth failed to establish |
| | 0.2 | Good antibacterial efficacy | Good antibacterial efficacy | on all of the PU foams tested | on all of the PU foams tested* |
| | 0.4 | Excellent antibacterial efficacy | Excellent antibacterial efficacy | | After 7 days, |
| | 0.5 | Excellent antibacterial efficacy | Excellent antibacterial efficacy | | there was inhibition of fungi |
| | 0.7 | Excellent antibacterial efficacy | Excellent antibacterial efficacy | | around the foams treated |

TABLE 1-continued

| | | [] Antimicrobial Test Results. | | | |
|---|---|---|---|---|---|
| Sam-ple | Liquid anti- | Jiz z 2801 Antibacterial Surface Test | | ASTM G-21 Fungal resistance test | |
| fa-mily | microbial (%) | *Escherichia coli* | *Staphylococcus aureus* | Nutrient salts agar | Malt agar |
| 2 | 0 | No reduction in bacterial count | No reduction in bacterial count | | at 0.4, 0.5 & 0.7% |
| | 0.2 | Good antibacterial efficacy | Good antibacterial efficacy | | |
| | 0.4 | Good antibacterial efficacy | Excellent antibacterial efficacy | | |
| | 0.5 | Good antibacterial efficacy | Excellent antibacterial efficacy | | |
| | 0.7 | Excellent antibacterial efficacy | Excellent antibacterial efficacy | | |

*Only traces of hyphal growth through the holes in the foam were only visible with a stereo microscope. Active growth on the test surface was not observed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A molded polyurethane vehicle seat component comprising:

a reaction product of a reaction composition including:
one or more isocyanates,
one or more polyols,
water,
a liquid antimicrobial agent that is a liquid at temperature above 10° C., wherein the liquid antimicrobial agent is an isothiazolinone in an amount of 0.1 to 2 weight percent of the total weight of the molded polyurethane vehicle seat component, and
a catalyst, wherein the reaction product is formed in a mold shape to form the molded polyurethane vehicle seal component.

2. The molded polyurethane vehicle seat component of claim 1, wherein the molded polyurethane vehicle seat component is a seat back cushion, a head restraint cushion, or an armrest.

3. The molded polyurethane vehicle seat component of claim 1, wherein the liquid antimicrobial agent includes a compound selected from the group consisting of 2-n-butyl-1,2-benzisothiazolin-3-one, 2-n-octylisothiazolin-3-one, methylisothiazolin-3-one, and combinations thereof.

4. The molded polyurethane vehicle seat component of claim 1, wherein the liquid antimicrobial agent includes is 2-n-butyl-1,2-benzisothiazolin-3-one.

5. The molded polyurethane vehicle seat component of claim 1, wherein the molded polyurethane vehicle seat component includes the liquid antimicrobial agent and/or residues thereof includes the liquid antimicrobial agent in an amount of 0.3 to 1.2 weight percent of the total weight of the molded polyurethane vehicle seat component.

* * * * *